United States Patent [19]

Pierrat

[11] Patent Number: 4,524,644
[45] Date of Patent: Jun. 25, 1985

[54] COUNTERWEIGHT FOR ORBITAL DRIVE MECHANISM

[76] Inventor: Michel A. Pierrat, 48 Farrwod Dr., Andover, Mass. 01810

[21] Appl. No.: 486,329

[22] Filed: Apr. 19, 1983

[51] Int. Cl.³ .............................................. F16H 1/28
[52] U.S. Cl. .................... 74/804; 74/573 R; 74/805
[58] Field of Search ............ 74/804, 805, 570, 573 R, 74/589, 590, 591

[56] References Cited

U.S. PATENT DOCUMENTS

| | | | |
|---|---|---|---|
| 1,682,563 | 8/1928 | Hill | 74/462 |
| 2,168,164 | 8/1939 | Kittredge | 74/805 X |
| 3,052,138 | 9/1962 | Louton, Jr. et al. | 74/805 |
| 3,144,791 | 8/1964 | Menge, Sr. | 74/805 X |
| 3,429,393 | 2/1969 | Lorence | 74/805 X |
| 3,783,712 | 1/1974 | Colinet | 74/805 |
| 3,955,445 | 5/1976 | Osterwalder | 74/805 |
| 3,998,112 | 12/1976 | Pierrat | 74/805 |
| 4,023,441 | 5/1977 | Osterwalder | 74/805 |
| 4,050,331 | 9/1977 | Braren | 74/804 |
| 4,271,726 | 6/1981 | Ryffel | 74/805 |

OTHER PUBLICATIONS

"Dojen Orbital Drive", Dolan-Jenner Industries, Bulletin 1200B.

*Primary Examiner*—Leslie A. Braun
*Assistant Examiner*—Dwight G. Diehl
*Attorney, Agent, or Firm*—E. Thorpe Barrett

[57] ABSTRACT

A speed reduction mechanism having an orbital drive system. A first crank arm drives the orbital system and a second crank arm, offset by 180 degrees, carries a counterweight for counter balancing the off center forces produced by the orbital system.

To minimize inertia, the counterweight is symmetrically shaped about its axis and is mounted for free rotation about the second crank arm. Such a counterweight may have a smaller degree of eccentricity and a correspondingly greater mass than a conventional counterweight, but because the inertia is a function of the square of the eccentricity of the counterweight, the inertia may be significantly less.

6 Claims, 2 Drawing Figures

COUNTERWEIGHT FOR ORBITAL DRIVE MECHANISM

BACKGROUND OF THE INVENTION

1. Field of the Invention

This invention relates to orbital drive systems and more particularly to a counterweight construction that significantly reduces inertia caused by the mass of the counterweight.

2. Description of the Prior Art

Orbital drive systems, that is systems in which one or more cams or other structures move about an orbital path offset from the center of rotation of the drive shaft are well known in the art. Speed reduction mechanisms making use of epicyclical movements and gears having a perimeter defined by an epitrochoid curve have long been known. The magazine Design News in its Aug. 18, 1961 issue describes a single-stage cycloidal cam that forms the basic of a speed reducing mechanism. A similar structure is shown in U.S. Pat. No. 1,682,563 to Hill. Corresponding devices were previously known that made use of spur gears. U.S. Pat. No. 2,250,259 to Foote, Jr. describes such a heliocentric unit. Other related mechanisms are described in U.S. Pat. Nos. 3,429,393; 3,144,791; 3,783,712; and 3,144,791. Some of these mechanisms incorporate two stages so that the output shaft is in line with the input shaft.

My earlier U.S. Pat. No. 3,998,112 describes a speed reducing mechanism in which a series of rollers are equally spaced in a circle on a disk to perform operationally somewhat like an internal ring gear. Mounted for eccentric movement and simultaneously engaging each of the rollers is an orbital rotor having a perimeter defined by an epitrochoid curve with a number of lobes equal to one less than the number of rollers. The rotor is mounted for free rotation on an eccentric keyed to a drive shaft. Rotation of the drive shaft causes the rotor to move orbitally and to rotate with a speed reduction equal to the reciprocal of the number of lobes on the rotor. A similar structure may serve as a second stage with a second orbital rotor driven by the first rotor and moved orbitally by the same eccentric. The second stage provides a further speed reduction and an output drive, connected to the disk supporting the rollers in the second stage, that is in alignment with the input drive shaft.

An improved drive system with significantly less backlash is described in my co-pending application Ser. No. 06/344,886, filed Feb. 1, 1982, entitled Speed Reducer and Method for Reducing Backlash. Each of these units makes use of a pair of counterweights secured to its drive shaft to prevent excessive vibration that would otherwise be caused by the orbital movement of the two cams mounted for free rotation on an eccentric driven by a rotating shaft. Those counterweights, which rotated with the drive shaft, were effective in minimizing vibration, but added significantly to the inertia of the system.

SUMMARY OF THE INVENTION

In accordance with the present invention, a counterweight is symmetrical about and is free to rotate on its own axis. That axis is driven by an eccentric mechanism turning in unison with the drive shaft so that the entire counterweight follows an orbital path offset 180 degrees from the offset of the eccentric that drives the primary orbital mechanism. The counterweight, being free to rotate about its own axis, can be provided with a smaller eccentricity so that, although the mass of the counterweight may be greater, the inertia is reduced significantly.

DESCRIPTION OF THE PREFERRED EMBODIMENT

Figure 1:
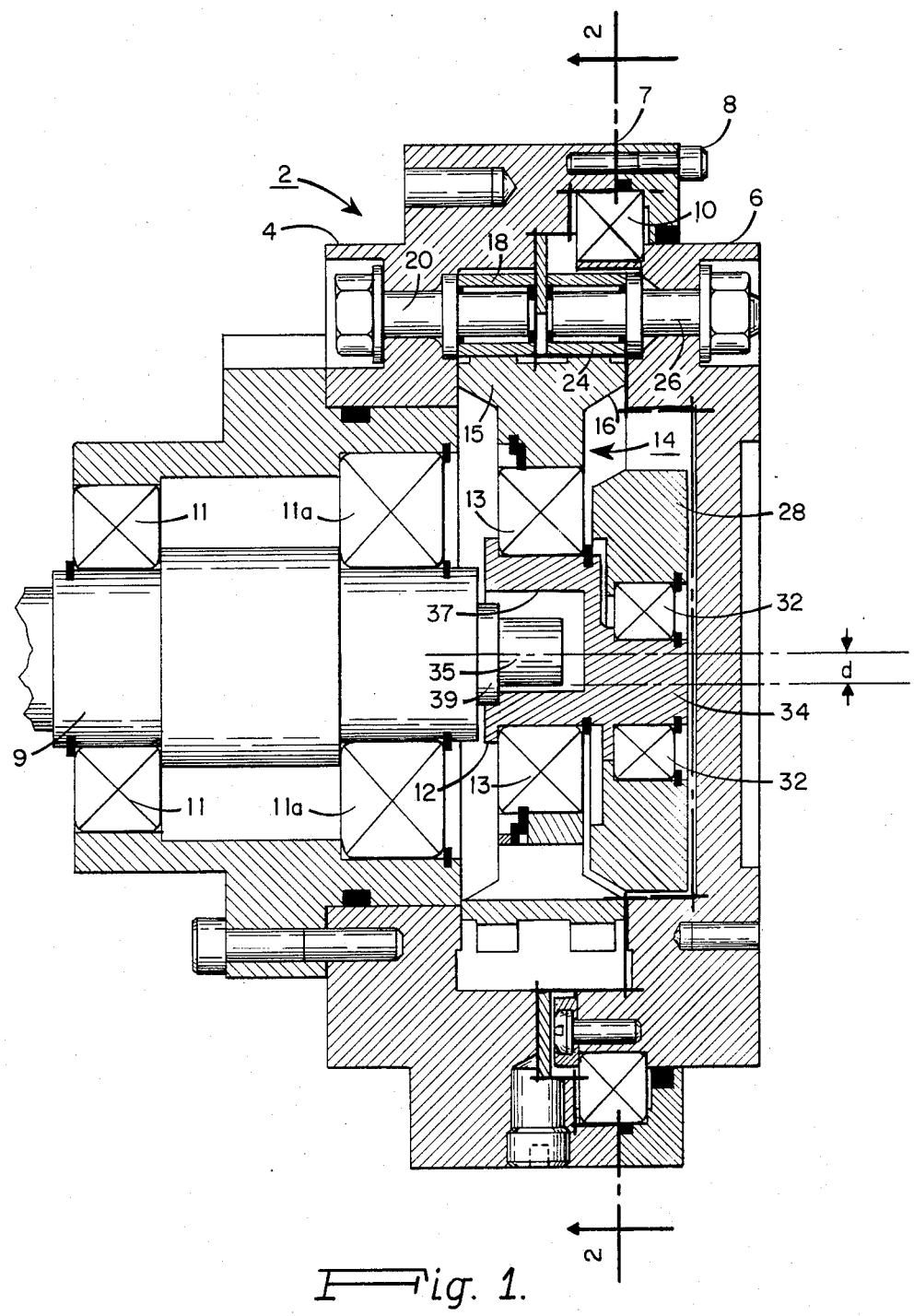
FIG. 1 shows a longitudinal section through a speed reduction mechanism embodying the invention.
Figure 2:
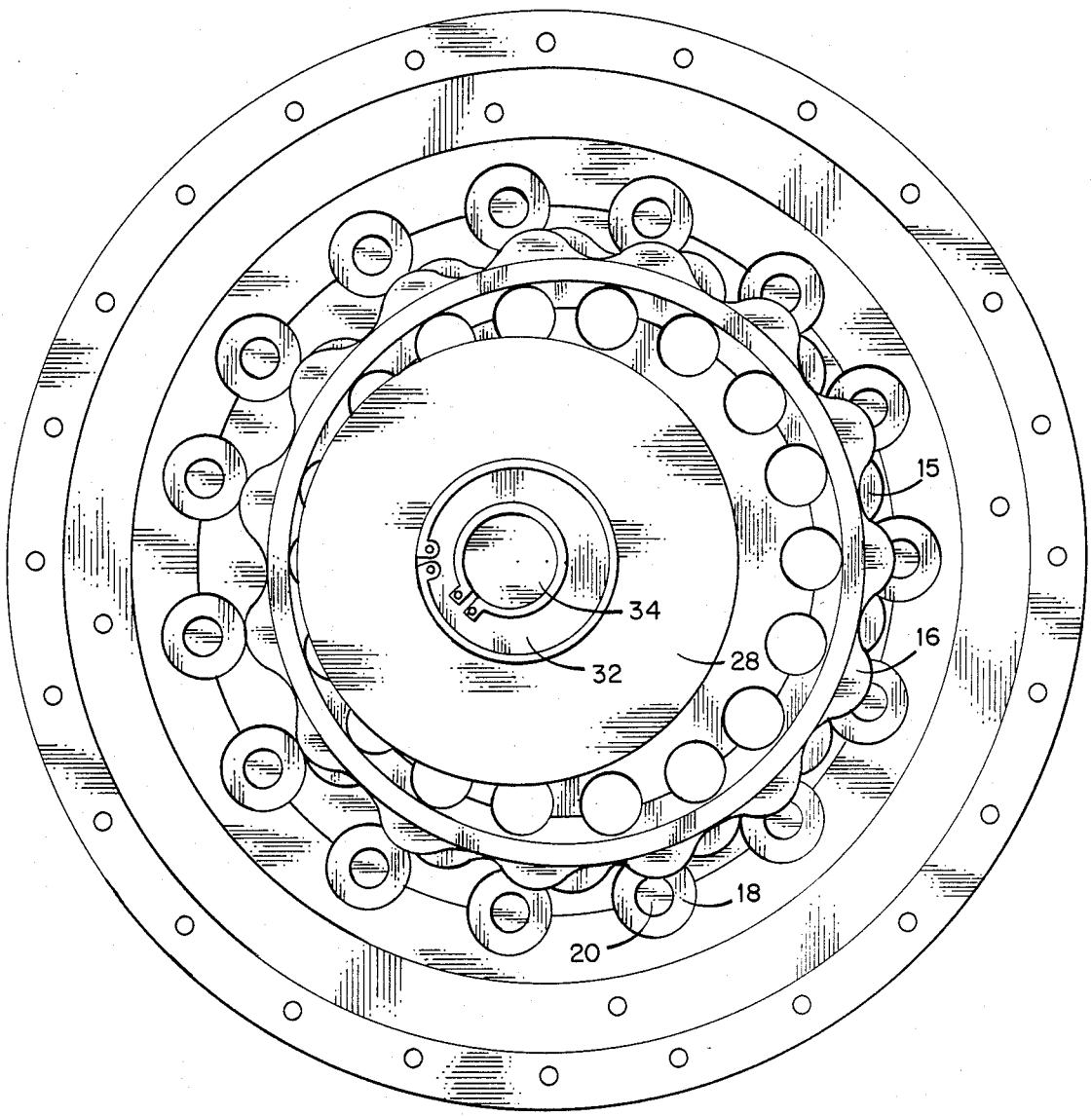
FIG. 2 is an elevational view taken generally along line 2—2 of FIG. 1.

As shown in FIG. 1, the unit is enclosed in a housing, generally indicated at 2, formed of a fixed reaction section 4 and a rotatable output section 6, the two sections being maintained in face-to-face relationship by a flange 7 fastened with screws 8.

In the unit illustrated, speed reduction is attained between the rotary speed of an input drive shaft 9 and the output housing section 6, the housing section 6 being rotatably mounted by means of a bearing 10 between the two housing sections.

The shaft 9 is supported by two bearings 11 and 11a. An eccentric member 12 is driven by the shaft 9 and rotates within a bearing 13 mounted in an orbital rotor assembly, generally indicated at 14, comprising a reaction stage orbital rotor 15 and an output stage orbital rotor 16.

Fifteen rollers 18, each supported by a shaft 20, are mounted on a reaction disk formed integrally with the housing section 4, and arranged equally spaced in a circle to form an operating structure somewhat similar to an internal ring gear that cooperates with the reaction stage rotor 15.

The perimeter of the rotor 15 is formed by a series of fourteen external lobes defined by an epitrochoidal curve. The radial distance between a point at the minimum radius position between two successive lobes, when the eccentric is positioned to place that point at maximum radial distance from the center of the drive shaft 9, is equal to the distance from the center of shaft 9 to the innermost point on each roller 18. Each of these rollers is at all times in contact with the outer surface of the reaction rotor 15.

An output stage disk formed integrally with the housing 6, supports a similar series of fourteen rollers 24 (shown only in FIG. 1) arranged in a circle and each rotatably supported by a shaft 26. These rollers are simultaneously engaged by the outer surface of the output stage rotor 16, which is also in the form of the epitrochoid curve, but in this instance has fifteen lobes.

When the input shaft 9 is driven, the eccentric 12 causes the reaction rotor 15 to move orbitally, during which movement the outer surface of the rotor remains at all times in contact with each of the reaction stage rollers 18. This orbital movement of the rotor causes it to revolve about its own axis at a speed equal to one-fourteenth the speed of the shaft 9 and in the opposite direction.

The output stage rotor 16, which is either secured to or formed integrally with the rotor 15, is thus positively driven in a direction opposite from the direction of rotation of the input shaft 9 while being moved orbitally by the eccentric 12. This stage provides a further speed reduction.

The mechanism so far described is similar in structure and operation to that described in applicant's U.S. Pat. No. 3,998,112.

A counterweight 28 is rotatably mounted, by means of a bearing 32, on an extension or crank arm 34 formed integrally with the eccentric 12. The crank arm or countershaft 34 is offset from the axis of shaft 9 in a direction opposite from the offset of the eccentric 12 that drives the orbital rotor assembly. To drive the counterweight mechanism, the shaft 9 is provided with an extension 35, which may be non-circular in cross-section, and extends into a bore 37 in the counterweight 28. The eccentric 12 is locked for rotation with the drive shaft 9 by a collar 39, formed integrally with the shaft 9, which extends into an off-center bore in the face of the eccentric 12. By means of this locking collar 39, the counterweight 28 is maintained always displaced 180 degrees from the direction of maximum offset of the orbital rotor assembly. The collar 39 serves to lock the eccentric in the appropriate position relative to the orbital rotor assembly, but actual driving of the eccentric is effected by the extension 35. The driving mechanism associated with the extension 35 may be similar to the one described in my co-pending application Ser. No. 352,122, filed Feb. 25, 1982, entitled "Orbital Speed Reducer with Compensation Coupling".

The offset of the axis of the countershaft 34, and thus the offset of the counterweight 28 from the axis of the drive shaft 9 is indicated by dimension "d" in FIG. 1. In this example, the distance "d" is twice the offset of the eccentric 12 with respect to the rotor assembly. This counterweight effect could be accomplished by a weight connected by an arm to the shaft 9 and arranged to rotate therewith. That is the arrangement described in my earlier patent mentioned above. However, when that arrangement is used in an application requiring rapid acceleration or deceleration, the inertia represented by the counter weight may become objectionable.

Such an arm might, for example, have an eccentricity equal to ten times the eccentricity of the rotor assembly and thus require a mass only one tenth that of the rotor assmebly. Although the mass of the counterweight is only one-tenth of the mass of the rotor, the inertia is greater by a factor of ten than that of the rotor. This is because the inertia is a function of the product of the mass and the square of the eccentricity.

To produce the desired counterweight effect with lower inertia, the symmetrical counterweight 28, in the form of a solid uniform metal disk, is mounted for free rotation on the bearing 32 on the crank arm 34. The eccentricity "d" of the counterweight 28, measured by the distance from the center of the counterweight to the axis of symmetry is, in this example, double the eccentricity of the rotor 14 and therefore would need a mass equal to one-half the mass of the rotor assembly 14. Although the mass of the counterweight has been increased appreciably, the inertia of the counterweight 28 is only twice that of the rotor assembly 14, instead of the factor of ten as in the previous example. This important reduction in inertia is achieved because the counterweight is free to rotate on the crank arm 34.

The reduction is inertia achieved by this invention is particularly important in applications such as a speed reducing joint for use in robotics where rapid acceleration and deceleration are important requirements.

I claim:

1. In a speed reducing mechanism comprising
   an orbital rotor assembly having a perimeter defined by an epitrochoid curve,
   a set of rollers positioned in a circle and arranged respectively to operatively engage said perimeter of said rotor assembly,
   a drive shaft, and
   a first eccentric means connected to said drive shaft and arranged to drive said rotor assembly in an orbital path,
   a counter balance mechanism including
   a second eccentric means including a countershaft connected to said drive shaft and offset 180 degrees from said first eccentric means, and
   a counterweight rotatably mounted on said countershaft and having its mass symmetrically distributed about the axis of said countershaft.

2. A speed reducing mechansim as claimed in claim 1 wherein said counterweight of said counter balance mechanism comprises a circular metal disk.

3. In an orbital drive mechanism of the type having drive means arranged to rotate about an axis of symmetry,
   a first eccentric means rotatable about and offset from said axis of symmetry, and
   rotor means rotatably mounted on said eccentric means and arranged to be driven in an orbital path,
   counter balancing apparatus for said rotor means including
   second eccentric means driven by said drive means and offset from said axis of symmetry in a direction opposite from the offset of said first eccentric means, and
   a counterweight symmetrically mounted for free rotation on said second eccentric means.

4. An orbital drive mechanism as claimed in claim 3 wherein said counterweight of said counter balancing apparatus comprises a circular metal disk.

5. An orbital driven mechanism as claimed in claim 3 wherein said counter balancing apparatus further comprises a bearing between said second eccentric means and said counterweight.

6. An orbital mechanism as claimed in claim 3 wherein said second eccentric means of said counter balancing apparatus is formed integrally with said first eccentric means.

* * * * *